United States Patent [19]  
Puskaś

[11] 4,092,560  
[45] May 30, 1978

[54] VAPOR DISCHARGE LAMP CERMET ELECTRODE-CLOSURE AND METHOD OF MAKING

[75] Inventor: Ferenc Puskaś, Budapest, Hungary

[73] Assignee: Chemokomplex Vegyipari Gepes Berendezes Export-Import Vallalat, Budapest, Hungary

[21] Appl. No.: 540,714

[22] Filed: Jan. 13, 1975

[30] Foreign Application Priority Data

Jan. 15, 1974 Hungary .............................. PU 189

[51] Int. Cl.² .......................... H01J 1/88; H01J 19/42
[52] U.S. Cl. .................... 313/244; 313/246; 313/326; 313/217; 29/25.14; 29/25.17
[58] Field of Search ............... 313/326, 340, 346, 218, 313/244, 246, 217, 334; 29/25.14, 25.17

[56] References Cited

U.S. PATENT DOCUMENTS

| 2,042,195 | 5/1936 | Scott | 313/246 X |
|---|---|---|---|
| 2,405,089 | 7/1946 | Craig | 313/246 X |
| 2,433,218 | 12/1947 | Herzog | 313/246 X |
| 2,451,297 | 10/1948 | Moore | 313/246 X |
| 2,732,514 | 1/1956 | Henderson | 313/246 |
| 3,051,592 | 8/1962 | Woerner | 313/340 |
| 3,051,592 | 8/1962 | Woerner | 313/340 |
| 3,232,717 | 2/1966 | Hill et al. | 313/218 |
| 3,588,577 | 6/1971 | McVey | 313/218 |
| 3,747,590 | 7/1973 | Motley | 313/326 |
| 3,758,184 | 9/1973 | Menzel | 313/218 X |
| 3,803,441 | 4/1974 | Ohsawa et al. | 313/340 |
| 3,849,690 | 11/1974 | Cosco et al. | 313/218 |
| 3,885,184 | 5/1975 | Schat et al. | 313/220 |

Primary Examiner—Saxfield Chatmon, Jr.

[57] ABSTRACT

A cermet seal for high pressure gas discharge lamps which also serves as an electrode, is made from a metallic component suitable for use as an electrode, and a ceramic component which is a metal oxide, by mixing the ingredients in a powdered form, then molded, pre-fired and then final-fired in a protective atmosphere by sintering into an electrically conductive, vacuum-dense polycrystalline body.

9 Claims, 6 Drawing Figures

VAPOR DISCHARGE LAMP CERMET ELECTRODE-CLOSURE AND METHOD OF MAKING

DETAILED DESCRIPTION

Figure 1:
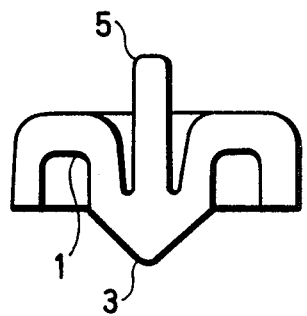
Figure 2:
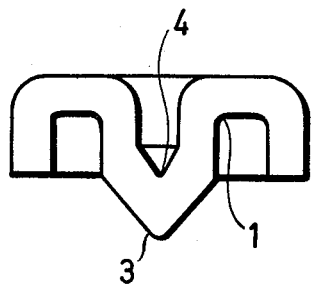

The present invention relates to a cermet-based cathode and seal high pressure sodium discharge lamps and to a method for making the same.

Modern illumination technology requires light emitters of increasing intensity and increasing useful life. Another important requirement is an increased efficiency in the utilization of the energy consumed, i.e. the newer light emitters are expected to radiate more light at the same level of energy consumption, or they should emit the same amount of light with a lower energy requirement as other known light sources. Halogen, mercury and high pressure sodium vapor lamps satisfy these requirements. At the present time the best utilization of energy input and approximation of the spectral composition of sunlight is accomplished by sodium vapor lamps.

In spite of the given advantages the increase of utilization of high pressure sodium vapor lamps takes place at a relatively low rate. This is partly due to problems encountered in the production and sealing with electrodes of the so called light tubes of such lamps. The light tubes are usually made from light transmitting, densified, polycrystalline alumina ceramic tubes.

The light tubes of high pressure sodium vapor lamps are sealed usually with electrode metals, suitably a closing electrode cap made from niobium plate. The shaping of the metal plate is a complicated procedure, because the metal is brittle and fragile. Fabrication of the electrode-closure caps, and their combination with the light tube is complicated by the fact that the sodium iodide-mercury charge which promotes ionization and asures the required spectral composition and radiation intensity, is charged into the tube sealed with the electrodes and evacuated, by means of a suction tube sealed to the electrode. The suction tube is made from a less brittle metal and the sealing of the interior of the lighting tube is accomplished after evacuation, by becoming vacuum tight after compression of the tube during fabrication. The preparation of the electrodes, the closure of the tube, its evacuation and creation of the vacuumtight closure are all complicated tasks. The known techniques, briefly stated, employ the following steps:

1. The cathode electrode closure caps are cut out from the sheet metal (with a bore and possibly with a rim).
2. The suction tube is cut from metal stock.
3. The electrode closure cap and the suction tube are welded together, mainly by electron beam welding.
4. Active metallizing at high temperature of the ends of the ceramic tube.
5. Sealing of the lighting tube to the electrode closure cap by soldering with the active metallized layer, or by adhesive.
6. Insertion of the ionization charge.
7. Evacuation of the lighting tube through the suction tube.
8. Creation of the vacuumtight seal by compression of the suction tube.

Another problem is created in the closure of lighting tubes carried out with metal plate and generally metal electrodes, by the differences in the thermal expansion coefficients. This is, because the material of the electrode metal sheets can contain only very fine crystals, otherwise their utilization for the fabrication of electrodes would become impossible due to excessive brittleness and fragility. On the other hand, fine structured metals have a higher coefficient of thermal expansion than the coarser crystalline ones. Due to the operating conditions of the lamps the lighting tubes are subjected to a temperature change each time the lamp is turned on. At that time the lighting tube heats up to a temperature of about 800° C, and when the lamp is turned off the the tube cools off to ambient temperature. The difference in thermal expansion coefficients brings about a thermally induced movement and, therefore, lighting tubes made from a ceramic have become frequently broken or developed cracks. There have been attempts to correct this problem by employing adhesives or soldering materials the thermal expansion coefficient of which is intermediate to that of the materials that are joined, thus relieving the stresses which occur due to the differences in the expansion coefficients.

According to the latest known improvements the electrodes are made from the same kind of dense, polycrystalline alumina ceramic as the light tube itself that is to be sealed. Thus the thermal expansion coefficients are identical. However, since alumina is an electrical isolator, the problem of supplying electricity for the operation of the electrodes had to be solved. The ceramic cathode base is therefore coated with tungsten. The tungsten layer which is applied by sputtering or other similar means is sufficiently thick to conduct the necessary amount of electricity. No thermal expansion differential stresses occur and, therefore, there is no need for the transitional stress releaving function of an adhesive or intermediate sealing material. The filling, evacuating and closing of the tubes does not require complicated solutions by employing suction tubes. This is because one of the electrodes with the adhesive thereon is connected to the lower part of the ceramic tube, the ionization charge is inserted through the upper, open end and then an electrode is placed onto the upper end. Then the tube is placed into a vacuum oven and evacuation and sealing can take place simultaneously. In this manner the charging, evacuating and sealing of the tube can be carried out in an automatic process.

A drawback of this latest process is that it requires the fabrication of an alumina electrode from alumina powder, which means that the alumina has to be molded and fired in several steps. The final firing takes place at about 1940° C in vacuum or under a protective hydrogen atmosphere. Following that the alumina cathode is coated with an electrode metal coating such as by sputtering and then the metal layer has to be fixed by another firing at elevated temperatures.

It is an object of the present invention to improve the technology of manufacturing high pressure sodium vapor lamps by employing a shaped cermet cathode and tube sealing cap. According to another object of the invention the cermet cathode is produced by powder metallurgic techniques.

The electrode sealing cap in accordance with the present invention can be characterized that it is made from a material which is electrically conductive throughout its entire cross section and is made from a cermet of vacuumtight density in which the metallic component or components are from an electrode metal, suitably from niobium, molybdenum, rhenium, tungsten, tantalum or their mixtures, and the ceramic component is a metal oxide, suitably alumina, beryllia, zirconia, titania or their mixtures. It is a characteristic feature of the cermet cathode and tube seal of the present invention that it is provided with one or more affixing portion or members which fit onto the end of the lighting tube, such as a groove, flange, electrode peak which protrudes into the interior of the lighting tube, and can also be provided with outer affixing portions or members, such as an outer cavity and a stem.

The process of the present invention for the production of the electrode and tube closure by powder metallurgic techniques, particularly for the purpose of high pressure sodium vapor lamps, is characterized by molding one or more electrode metals or their oxides in a powdered form with one or more oxide ceramic raw materials in a mixture, such as by pressing or dye casting, and then prefiring the molded item suitably at a temperature between 1000° and 1360° C, and then sintering the prefired object in a reducing atmosphere or in vacuum suitably at a temperature between 1800° C and 2200° C for a period of at least 5 minutes to obtain a polycrystalline, electrically conducting body sintered to a sufficiently vacuumtight density.

The metallic component of the electrode tube seal of the present invention is one or more of the metals niobium, molybdenum, rhenium, tantalum, or tungsten, and the ceramic metal oxide component of the cermet is one or more of alumina, beryllia, zirconia, or titania. The electrode metal can also be eployed in the form of their respective oxides and then these oxides can be reduced to their corresponding metals during sintering in a reducing atmosphere. The powdered metal and metal oxide components of the raw material mixture are employed as a powder having an average particle size under 5 micrometers, suitably about 5 micrometers.

The electrode tube closure of the present invention can be attached to the light-transmitting, vacuumtightly dense, polycrystalline alumina ceramic discharge tube of high pressure sodium vapor lamps by adhesion or by atomizing techniques.

The present invention is further illustrated by various embodiments of the electrode-closure shown in the accompanying drawing and FIGS. 1–6 thereof, wherein:

FIGS. 1–6 illustrate in a schematic cross-sectional representation various configurational embodiments of an electrodeclosure according to the present invention. The electrodeclosure embodiments of FIGS. 1–2 and 5–6 are designed with an annular groove which a discharge or light tube of a high pressure sodium vapor lamp fits into.

Figure 3:
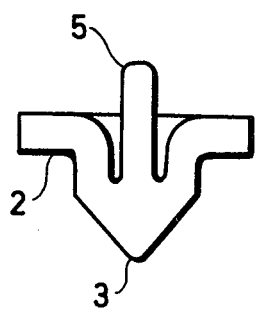
Figure 4:
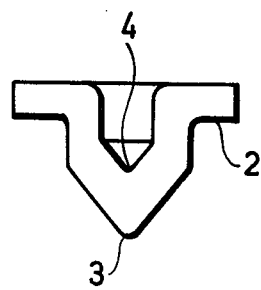
Figure 5:
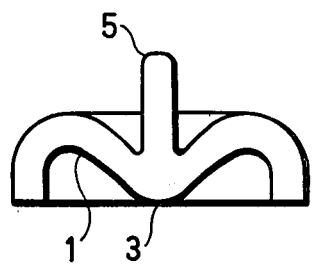
Figure 6:
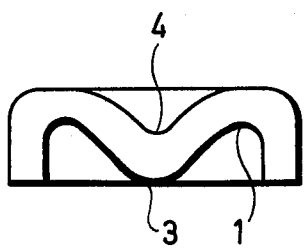

In the electrode closure embodiments of FIGS. 3 and 4 an annular flange or shoulder is provided to fit over the edge of the discharge tube of the lamp. In FIGS. 1, 3 and 5 a stem is provided for the attachment of an electrical lead, while in FIGS. 2, 4 and 6 a socket is provided for that purpose.

In the drawing:

1 is a groove which fits over the end of the discharge tube, 2 is a flange or shoulder which fits over the end of the discharge tube, 3 is the peak of the electrode which ranges into the discharge tube, 4 is the outer outer connecting socket of the electrode, and 5 is the outer connecting stem of the electrode.

Particularly advantageous embodiments of the cermet electrodes of the present invention become electrically conductive only when they have been heated above a certain temperature. In the case of such cathodes the vaporization of the ionization charge can be accomplished without the use of a starter ignition device. This represents a major advance in illumination technology and assists miniaturization. In this manner it will now become possible to employ high pressure sodium vapor sunlight lamps in interior lighting applications.

The advantages of the process of the present invention can be summarized as follows:

1. The most suitably shaped and dimensioned products can be prepared for the desired practical requirements by producing the electrode closure by poder metallurgical techniques.

2. The thermal expansion coefficient of the cermet electrode closure cap is lower than those of the customary electrode metals, thus the thermal expansion coefficient can be matched to the corresponding parameters of the light tube.

3. Optimum metal powder-metal oxide mixtures can be employed from a technical and economical point of view for producing the electrode.

4. The cermet electrode (cathode) of the present invention combines the advantageous properties of the cathodes made from metal sheets and ceramics. Thus electrical conductivity and thermal conductivity properties of the present cathodes can be matched to those made from metal sheets. Also the advantages of ceramic cathodes can be realized, such as charging without suction tubes, and evacuation and vacuum tightness. Compared to metal-coated ceramic cathodes the advantage is obtainable by means of the present invention that it is not necessary to apply separately a metal layer, because the cermet electrode conducts electricity as well as that made from sheet metal.

5. A further advantage is obtained by the fact that that the charging with the ionizing material, evacuation, vacuumtight sealing by adhesion or soldering, can be accomplished entirely by automatic techniques.

The cermet electrode and closure cap of the present invention is illustrated with the following detailed examples, without limiting the invention thereto.

EXAMPLE 1

The following powder mixture is employed:
25%(wt) niobium metal or oxide having an average particle size under 10 micrometers. If an oxide is employed, the equivalent calculated for the metal, is used.
35%(wt) metallic tungsten or its oxide, having a maximum average particle size of 5 micrometers. If an oxide is employed, its equivalent calculated for the metal is used.
40%(wt) alumina having a maximum average particle size of 2 micrometers.

Paraffin is dissolved in benzine, and 3%(wt), calculated on a dry basis of paraffin, is mixed with the above powder mixture. The benzine solvent is subsequently removed by use of a thermostatically controlled evaporator and the remaining powder is formed into granules having a particle size between 0.5 and 1 mm. The granulated cermet base material is formed into an electrode closure shape by pressing in a steel tool in automatic pressing machine under a pressure of about 1 ton / cm². These shapes can be suitably of the embodiments shown in FIGS. 1–6.

The shaped raw cermet body is embedded into synthetic carbon granules or into alumina powder and is prefired at about 1000° C in a furnace protected with hydrogen atmosphere. Subsequently the paraffinfree prefired electrodes are sintered in a hydrogen protective atmosphere or vacuum at about 2000° C.

The sintered cermet cathode is provided in its groove 1 or on the flange 2 with a coating of a glass-like adhesive which resists sodium iodide and mercury vapors at elevated temperatures.. A suitable adhesive is described in British Pat. No. 961,670 and in U.S. Pat. No. 3,825,645.

Subsequently the lower end of a vertically positioned ceramic lighting tube is sealed with an electrode made as above, then the ionization charge is introduced through the upper end of the tube and then the top electrode is placed onto the top end of the tube. The tube is then subjected to vacuum and the ends of the tube are heated to the bonding temperature of the adhesive. The thus sealed discharge tube can then be employed as a finished light emitter.

EXAMPLE 2

A cathode and closure cap is prepared as in Example 1, except that the following starting mixture is employed: 35%)wt) niobium or rhenium metal or oxide having a maximum average particle size of 10 micrometers, 60%(wt) tungsten or molybdenum metal or oxide having a maximum average particle size of 5 micrometers, and 5%(wt) alumina having a maximum average particle size of 2 micrometers.

EXAMPLE 3

A cathode closure cap is prepared as in Example 1, except that the following starting mixture is employed: 5%(wt) niobium or rhenium metal or oxide having a maximum average particle size of 10 micrometers, 15%(wt) tungsten, molybdenum or tantalum metal or oxide having a maximum average particle size of 5 micrometers, and 80%(wt) alumina, beryllia or zirconia or a mixture of 98% alumina with 2% titanium dioxide, having a maximum average particle size. The dry weight of the paraffin dissolved in benzene is 10%(wt). When more than 50% ceramic-component-containing starting material is used in the composition of this example, then the resulting electrode can be employed in the high pressure sodium vapor lamp as a heating (starter) cathode.

I claim:

1. An end electrode closure for high pressure vapor discharge lamps, which comprises a shaped, sintered, electrically conductive cermet body made from an electrode metal component and a metal oxide ceramic component as ingredients, said body including an integral shaped part as an electrode.

2. The electrode-closure of claim 1, wherein the electrode metal component of the cermet is at least one of niobium, molybdenum, rhenium, tungsten and tantalum, and the metal oxide ceramic component of the cermet is at least one of alumina, beryllia, zirconia and titania.

3. The electode-closure of claim 1, wherein the cermet becomes electrically conductive when heated above a given temperature when the ceramic component constitutes over 50%(wt) of the cermet.

4. A process for making the electrode-closure of claim 1, which comprises preparing a mixture from a powdered electrode metal or its oxide with a ceramic oxide ingredient in powdered form, molding said mixture, and sintering the shaped body at a temperature between 1800° and 2200° C in a reducing atmosphere or in vacuum for a period of at least 5 minutes to convert the shaped body into a polycrystalline, electrically conductive, vacuumtighly dense cermet.

5. The process of claim 4, wherein the electrode metal is niobium, molybdenum, rhenium, tantalum, or tungsten, and the ceramic oxide ingredient is alumina, beryllia, zirconia, or titania.

6. The process of claim 5, wherein the electrode metal is an oxide thereof, and wherein said metal oxide is reduced to its corresponding metal during sintering.

7. The process of claim 4, wherein the maximum average particle size of the electrode metal powder and of the ceramic powder is 50 micrometers.

8. The process of claim 4, further comprising the step of prefiring the shaped body at a temperature between 1000° and 1360° C before the sintering thereof.

9. The process of claim 7, wherein the maximum average particle size of the electrode metal powder and of the ceramic powder is 5 micrometers.

* * * * *